Patented Mar. 6, 1951

2,544,236

UNITED STATES PATENT OFFICE 2,544,236

ZINC OXIDE-MAGNESIUM OXIDE LUMINOUS PIGMENTS ACTIVATED BY BISMUTH OR BISMUTH AND IRON

Lawrence J. Reimert and Erastus A. Fatzinger, Palmerton, Pa., assignors to The New Jersey Zinc Company, New York, N. Y., a corporation of New Jersey No Drawing. Application June 13, 1947, Serial No. 754,589

6 Claims. (Cl. 252—301.6)

This invention relates to luminescent pigments and contemplates the provision of a novel base material capable of activation to luminescence by a variety of activators.

It is known that zinc oxide can be treated so as to render it luminescent. All early attempts to activate zinc oxide resulted in a pigment having only a faint fluorescence. More recent accomplishments in this field have produced zinc oxide pigments of brighter fluorescence by special treatment such as calcination in a reducing atmosphere either with or without the presence of an activator such as bismuth. Activated zinc oxide pigments are generally characterized by a greenish fluorescence of intensity considerably below the commercially desirable level.

We have discovered that the addition of a minor amount of magnesium oxide to zinc oxide is capable of producing a novel base material which is not luminescent per se but which is capable of activation to brilliant luminescence. We have found that an intimate mixture of zinc oxide with a minor amount of magnesium oxide can be made to have this characteristic by calcination. The calcination may precede activation or it may be contemporaneous with activation. Thus, the novel base material for a luminescent pigment in accordance with our invention may be produced merely as a base material having no luminescence per se or it may be produced in the form of an activated pigment having the desired luminescence. In either condition the base material is such that it is capable of activation to luminescence and consists of a calcined mixture of zinc oxide and magnesium oxide.

The zinc oxide and magnesium oxide may be admixed as such, or either or both components may be a compound, such as the carbonate, which may be thermally decomposed to form the oxide. In general, we prefer to use zinc oxide as the zinc component because of its availability in finely divided and relatively pure form. Magnesia may be used effectively as the magnesium component, although magnesium carbonate appears to offer an advantage in permitting lower calcination temperature presumably because of the greater reactivity of the magnesium oxide as it is produced by decomposition of the carbonate over the reactivity of a previously prepared magnesium oxide.

The chemical purity of the zinc and magnesium components of our novel base material should be high. The base material has been found to have good luminescent qualities upon activation when C. P. grades of zinc oxide and magnesium oxide are used. The most satisfactory luminescence has been obtained, however, where the base material was prepared from U. S. P. zinc oxide and special "luminescent grades" of magnesium oxide, both of which are readily available on the market. The "luminescent grade" magnesium oxide referred to herein is the material which has been used heretofore as an anti-flux agent added in the preparation of luminescent pigments of the sulfide-type. Ordinary commercial grades of zinc oxide and magnesium oxide may be used although the impurities normally present in these components seriously degrade the ultimate luminescence of the activated base material.

The proportions of the components of the base material may vary over a considerable range. Although luminescent activated base materials have been obtained in which the zinc oxide and magnesium oxide were present in substantially equal parts by weight (i. e., 50% each), we have found that the magnesium oxide should comprise a minor proportion, and preferably not more than about 40%, of the zinc oxide-magnesium oxide mixture. Satisfactory base materials have been prepared in which the magnesium oxide comprised as little as 3% and as much as 40% of the zinc oxide-magnesium oxide mixture, although near each of these extremes the activated base material has considerably less luminescence than that of the optimum proportion of about 12% magnesium oxide. Within the extremes of about 8% to about 16% magnesium oxide the base material is generally capable of activation to a degree of luminescence at most only slightly inferior to that of the optimum composition. Percentages referred to herein and in the claims are on a dry weight basis.

The optimum composition of about 12% magnesium oxide and the balance (about 88%) zinc oxide appears to produce luminescent pigments of optimum brightness and color with any of the activators which we have found to be effective. The fact that the same optimum composition of the base material reappears for each of the luminescent zinc oxide-magnesium oxide pigments which we have investigated indicates that there is something unique about this particular composition. The magnesium oxide does not serve merely as a diluent. For example, the 88% zinc oxide-12% magnesium oxide composition shows by X-ray diffraction a pattern substantially characteristic of zinc oxide alone, thus indicating that a substantial portion of the magnesium oxide up to about 12% by weight of the mixture combines with the zinc oxide to form a solid solution of magnesium oxide in the zinc oxide. Thus, mixtures containing from about 3% to about 12% magnesium oxide may be considered as zinc oxide containing from about 3% to about 14% by weight of magnesium oxide in solid solution therein, the optimum composition being zinc oxide containing up to about 13-14% by weight of magnesium oxide in solid solution. The X-ray diffraction pattern of the optimum composition is somewhat more diffuse than that of zinc oxide without any added magnesium oxide and renders uncertain the determination of a possible shift in the zinc oxide lattice constants which would otherwise be more conclusive evidence of solid solution. However, there is further indirect evidence of solid solution in the optimum composition in that at an elevated temperature just below incandescence the composition does not show the intense yellow color characteristic of zinc oxide alone at this temperature.

The components of the base material should be intimately admixed regardless of whether these components are to be calcined alone or are to be calcined in further admixture with fluxes and activators. Mixing may be effected by any of the usual procedures, such as by wet or dry ballmilling, by passage of a rough blend through a Mikro-pulverizer, or by agitation in an aqueous slurry of moderate consistency. When it is desired to incorporate a small amount of flux or activator, or both, into the mixture of the base material components, this may be done in a dry mixing procedure, in a modified dry mixing procedure in which the flux and activator in the form of a solution or suspension in a volatile medium such as water or alcohol is sprayed onto the dry components, or by incorporating the flux and activator in the aqueous phase of a slurry. The order in which the materials are incorporated in the mixture appears to be unimportant provided effective mixing is obtained. However, in order to insure a good dispersion of the flux and activator (when used) in the slurry procedure, it is advisable to add these materials to the water prior to the addition of the major ingredients which thicken the slurry. In any type of wet mixing procedure, drying should be effected without preliminary filtering so as to avoid the loss of soluble flux or activator. The dried material should be pulverized in order to minimize any tendency toward aggregation during subsequent calcination.

Calcination of the components of the base material, either alone or in the presence of added flux or activator, should be effected in the form of a loose charge subjected to a minimum of packing. The calcination temperature should range between about 850° C. and about 1300° C. for effective results. The calcined base material of the invention may be produced within this temperature range with calcination periods ranging from as short as one hour at the lowest temperature to as long as 13 hours at the highest temperature. When the components of the base material are calcined in the presence of an added ingredient to produce an activated pigment, the same temperature and time limits appear to prevail except that optimum temperatures and periods may exist for a particular activated pigment as hereinafter more fully discussed.

The calcination atmosphere used in the preparation of the base material itself may be neutral, oxidizing or reducing with respect to the components of the base material. Zinc oxide-magnesium oxide base material capable of activation to luminescence has been produced using atmospheres of hydrogen, carbon monoxide, carbon dioxide, nitrogen, water vapor, air and oxygen. However, where activation of the base material is effected during calcination, the choice of calcination atmosphere depends upon the nature of the activation desired. For example, in the presence of a lithium sulfate flux the zinc oxide-magnesium oxide mixture is capable of being activated simply by calcination in a reducing atmosphere of hydrogen or carbon monoxide. When the zinc oxide-magnesium oxide mixture is to be activated by calcination in the presence of a bismuth or bismuth-plus-iron activator, a neutral or oxidizing atmosphere is necessary. Calcination may be accomplished in a vessel of any suitable refractory material of reasonable purity such, for example, as silica, Alundum, magnesia or beryllia.

The following specific examples are illustrative of the novel luminescent products obtainable with the zinc oxide-magnesium oxide base material of our invention, although it is to be understood that the invention is not limited thereto. In these examples the percentage of added flux or activator, or both, is expressed on the dry weight basis and represents the percentage of the actual addition with respect to the zinc oxide-magnesium oxide mixture comprising the base material of the product.

EXAMPLE I

Activation with bismuth

A number of luminescent pigments have been prepared using the zinc oxide-magnesium oxide base material of the invention activated by the presence of bismuth. The bismuth may be added in the form of an oxide or an inorganic or organic salt. We have obtained satisfactory results using bismuth oxide, hydrate, nitrate and lactate. The bismuth compound should be of C. P. grade or better (i. e. of luminescent grade or spectroscopically pure). The bismuth may be added in either the dry condition or in the form of a solution or suspension as previously described. Fluorescent products have been obtained by the addition of such a bismuth compound without the presence of an added flux. However, the fluorescence of the product is generally enhanced and considerable phosphorescence is developed by the presence of a lithium compound as a flux.

Pigments of good luminescence have been prepared using bismuth compounds in amounts throughout the range of about 0.01% to 10.8% (expressed as Bi). Within this range, strong luminescence has been obtained using bismuth in amounts ranging from about 0.1% to about 4%. Experiments have indicated that with small lots of pigment the optimum luminescence is obtained by using about 0.4% bismuth, although only slightly inferior luminescence is obtained when using more or less bismuth within the range of 0.1% to 4%. Somewhat less bismuth, of the order of 0.2% Bi, appears to give optimum luminescence in the preparation of larger lots of pigment probably because less bismuth is lost by volatilization from large calcination charges than from small charges.

The addition of a lithium flux, as noted hereinabove, enhances the fluorescence of the bismuth-activated pigment and further imparts phosphorescent qualities thereto. Lithium fluoride, lithium chloride, lithium sulfate and lithium phosphate have been used singly with effective results in amounts ranging from as low as about 0.1% to as high as 2.2%. Larger amounts of the lithium flux tend to enhance sintering and are considered undesirable for this reason. Optimum results have been obtained with about 0.5% of the lithium flux.

The lithium compound, and particularly lithium fluoride, can be used in combination with other fluxing material such as sodium sulfate, sodium carbonate, potassium sulfate and potassium carbonate. The presence of this additional fluxing material makes possible the use of still smaller quantities of the lithium flux. For example, a flux combination composed of 1.5% sodium sulfate plus 0.005% lithium fluoride is particularly satisfactory and produces results substantially equivalent to the use of the optimum amount of lithium fluoride alone. The amount of added flux material can be varied over wide limits, but the ratio of the added flux material (such as sodium sulfate) to the lithium flux (such as lithium fluoride) must be high in order to prevent the development of poor luminescent characteristics within the interior of the calcined pigment charge.

In the production of pigments activated by the presence of bismuth, either alone or with added flux, satisfactory results have been obtained using as the base material mixtures of zinc oxide and magnesium oxide containing as little as about 3% magnesium oxide and as much as 36% magnesium oxide. At these extremes the luminescence of the activated pigment is degraded but is still appreciable. Optimum results have been obtained using a mixture of 88% zinc oxide and 12% magnesium oxide. Within the range of about 3% to about 36% magnesium oxide, we have found that amounts of magnesium oxide above the optimum of 12% cause substantially less degradation of the luminescence than amounts of magnesium oxide less than the optimum value. The presence of both zinc oxide and magnesium oxide in the base material is essential for the development of luminescence. In the absence of either zinc oxide or magnesium oxide the desired activation cannot be achieved.

The temperature and period of calcination may be varied over a substantial range. Good luminescence can be obtained by calcining for about one hour at 900° C. as well as by calcining for as long as 16 hours at 1300° C. Maximum luminescence can be obtained by calcination for one hour at about 1200° C. The calcination atmosphere may be either neutral or oxidizing in nature, such gases as nitrogen, air and oxygen being suitable for this purpose. A reducing atmosphere during calcination is undesirable when producing zinc oxide-magnesium oxide pigments activated by bismuth.

The bismuth-activated pigments fluoresce and phosphoresce with a yellowish-orange color in response to relatively long wavelength ultraviolet excitation. The pigments respond particularly well to the 3650 Å. radiation of a mercury arc. The pigment responds poorly to excitation by relatively short wavelength ultraviolet excitation in the region of 2537 Å.

Although the bismuth-activated pigments fluoresce brightly when properly excited, the pigments are of particular interest because of their phosphorescent qualities. Their phosphorescence is pronounced and the rate of decay of this phosphorescence is unusually low. For example, in a standard test wherein a bismuth-activated pigment of the invention was excited by a 100 watt mercury black light lamp at a distance of about 40 inches, the pigment had a phosphorescent brightness of about 0.13 microlambert after a decay period of one hour following excitation. Under the same conditions, a commercial orange phosphorescent pigment of the zinc-cadmium sulfide type had a brightness of only 0.06 microlambert after the same decay period. The luminescence of the pigments is susceptible to quenching by red and near-infrared radiation, and for this reason they do not respond readily to the unfiltered incandescence of Mazda light. However, the susceptibility of the pigments to quenching by red light is no more pronounced than the susceptibility of a zinc-cadmium sulfide pigment to similar quenching.

The bismuth-activated pigments display excellent chemical and photochemical stability. No appreciable light darkening has been observed with these pigments. For example, there was no noticeable darkening obtained during a standard test comprising a 160-hour exposure of the pigment to an S-4 sun lamp-reflector combination at a distance of about 6 inches at a temperature of 45° C. and a relative humidity of 95%. Under the same test, a comparable zinc-cadmium sulfide pigment turned black.

If necessary, the activated pigment may be ground in order to increase its fineness. Any degradation of luminescence caused by such grinding can be essentially restored by reheating to the calcination temperature without appreciable sintering.

EXAMPLE II

*Activation with bismuth plus iron*

Although the pigments described in the preceding example have been stated to be activated by the presence of bismuth, it is possible that a small amount of the activation is due to the presence of iron which is unavoidably included in the pigment as a normal impurity in zinc oxide and magnesium oxide. U. S. P. zinc oxide and the luminescent grade of magnesium oxide in the optimum proportions of 88% and 12%, respectively, generally contribute about 0.001% by weight of iron to the mixture. We have found that the phosphorescent life of the pigment in response to ultraviolet radiation may be increased, somewhat at the expense of fluorescent brightness, by further increasing the total iron content of the pigment to about 0.0025%. Thus, when using U. S. P. zinc oxide and luminescent grade magnesium oxide in the optimum proportions, particularly effective results are obtained by the further addition of about 0.0015% iron in the form of an iron salt. Satisfactory luminescent properties may be realized when using a total iron content as high as 0.005%. However, increasing amounts of iron tend to poison the fluorescence of the pigment and poor fluorescence is obtained when the total iron content is increased to about 0.01%. This upper limit of total iron content is still effective in increasing the phosphorescent life of the pigment although it exceeds the amount which produces optimum phosphorescent qualities. Total iron contents less than the optimum amount of 0.0025% produce luminescence intermediate in quality to that obtained by the optimum amount of bismuth alone and that obtained from the optimum double activation by about 0.4% bismuth and 0.0025% total iron.

The additional iron incorporated in the pigment for double activation by bismuth and iron is advantageously added in the form of a dilute solution of an iron salt. This iron salt solution may be added at any time in the course of the preparation of the pigment mixture prior to calcination. Particularly effective results have been obtained by combining the iron solution with the bismuth solution, then evaporating the solution to dryness at 110° C., and adding the dried double-activator to the base material mixture by any of the procedures described hereinbefore.

The calcination procedure for the doubly-activated products is the same as that described for the base material activated by bismuth without added iron.

The doubly-activated base material fluoresces and phosphoresces in response to long wavelength ultraviolet radiation with substantially the same yellowish-orange color as the bismuth-activated products. The initial phosphorescence of the doubly-activated pigment after excitation by black light is slightly inferior to that of the pigment activated by bismuth alone, but the rate of phosphorescent decay is slower than that of the bismuth-activated pigment so that after a decay period of several minutes the doubly-activated pigment is brighter than the bismuth-activated pigment. After a decay period of one hour following excitation by black light, the phosphorescence of the doubly-activated pigment is about four times as bright as that of the pigment activated by bismuth without added iron. The addition of the iron as an auxiliary activator further increases the susceptibility of the pigment to quenching by infrared radiation. The doubly activated pigment shows poor luminescence under excitation with short wavelength ultraviolet radiation. The chemical and photochemical stability of the doubly-activated pigments are substantially the same as those of the bismuth-activated products.

The foregoing examples are illustrative of the novel characteristics of the zinc oxide-magnesium oxide base material of our invention. The mixture of zinc oxide and magnesium oxide within the range of proportions described hereinbefore acts, upon calcination, as a single new base material capable of activation to luminescence by a number of activators which yield novel luminescent products. The unusual luminescent properties of the activated products will immediately suggest to those in the art new uses for these products.

We claim:

1. A luminescent pigment consisting essentially of a base material consisting of a calcined mixture of zinc oxide and magnesium oxide, the magnesium oxide comprising from about 3% to about 36% by weight of said mixture, and about 0.01 to 10.8% by weight of a bismuth activator.

2. A luminescent pigment consisting essentially of a base material consisting of a calcined mixture of zinc oxide and magnesium oxide, the magnesium oxide comprising about 12% by weight of said mixture, and about 0.01 to 10.8% by weight of a bismuth activator.

3. A luminescent pigment consisting essentially of a base material consisting of a calcined mixture of zinc oxide and magnesium oxide, the magnesium oxide comprising from about 3% to about 36% by weight of said mixture, the base material being doubly activated with bismuth and iron, the bismuth being present in amount of about 0.01 to 10.8% by weight and the iron being present in an amount up to about 0.01% by weight.

4. A luminescent pigment consisting essentially of a base material consisting of a calcined mixture of zinc oxide and magnesium oxide, the magnesium oxide comprising from about 3% to about 36% by weight of said mixture, the base material being doubly activated with about 0.1 to 4% by weight of bismuth and an amount of iron comprising up to about 0.005% by weight of the base material prior to calcination.

5. A luminescent pigment consisting essentially of a base material consisting of a calcined mixture of zinc oxide and magnesium oxide, the magnesium oxide comprising about 12% by weight of said mixture, the base material being doubly activated with bismuth and iron, the bismuth being present in amount of about 0.01 to 10.8% by weight and the iron being present in amount up to about 0.01% by weight.

6. A luminescent pigment consisting essentially of a base material consisting of a calcined mixture of zinc oxide and magnesium oxide, the magnesium oxide comprising about 12% by weight of said mixture, the base material being doubly activated by about 0.01 to 10.8% by weight of bismuth and about 0.0025% iron by weight of the base material prior to calcination.

LAWRENCE J. REIMERT.
ERASTUS A. FATZINGER.

REFERENCES CITED

The following references are of record in the file of this patent:

UNITED STATES PATENTS

| Number | Name | Date |
|---|---|---|
| 2,028,980 | Korinth | Jan. 28, 1936 |
| 2,245,414 | Roberts | June 10, 1941 |
| 2,285,464 | Ruthruff | June 9, 1942 |
| 2,408,475 | Nickle | Oct. 1, 1946 |